Figure 1:
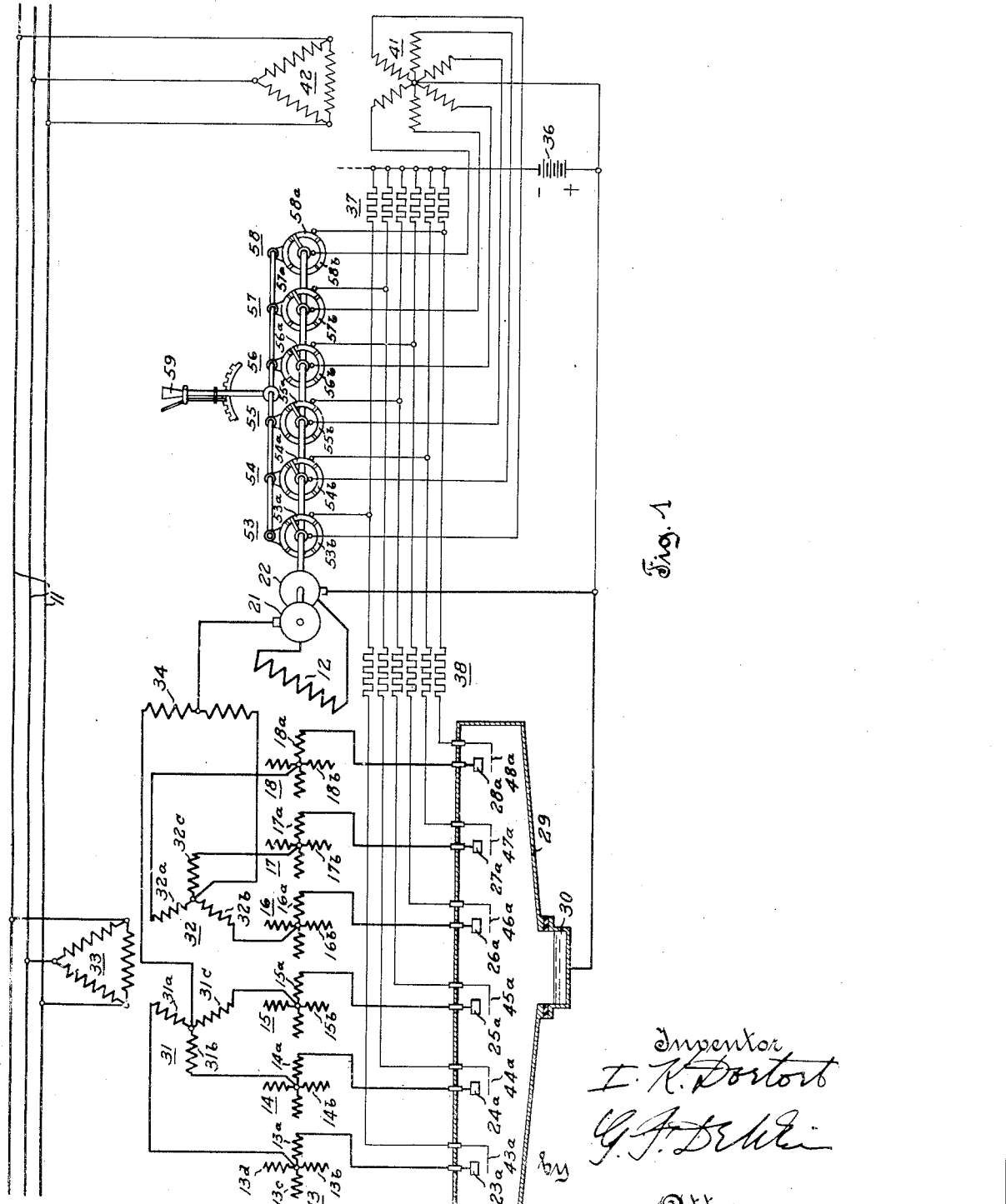

Nov. 2, 1937.   I. K. DORTORT   2,098,182
MOTOR CONTROL SYSTEM
Filed Oct. 1, 1932   4 Sheets-Sheet 2

Patented Nov. 2, 1937

2,098,182

UNITED STATES PATENT OFFICE 2,098,182

MOTOR CONTROL SYSTEM

Isadore K. Dortort, Milwaukee, Wis., assignor to Allis-Chalmers Manufacturing Company, Milwaukee, Wis., a corporation of Delaware Application October 1, 1932, Serial No. 635,842

20 Claims. (Cl. 172—274)

This invention relates to improvements in the control of electric motors and more particularly to the control of alternating current motors in which the armature current is not conducted through the usual type of mechanical commutator.

Alternating current motors without commutators are well known in the art, such motors generally comprising a rotating field excited with direct current and a fixed armature provided with suitable windings having the terminals thereof either directly connected with an alternating current supply line or else connected therewith through a transformer. Motors of the above character may be made operable at variable speeds by connecting the armature winding portions thereof into two or more star connected groups receiving current from the source or from a supply transformer through a single electron discharge device or through a group of electron discharge devices. When a motor is connected as indicated above, the entire armature current is carried at every instant by only one of the armature portions, the remaining portions thus being idle for the larger part of the time. The armature windings are thus not utilized to the best advantage and the motor must be made too large for its rating as compared with other motors of the same rating. By forcing a simultaneous flow of current through several of the winding portions at every instant, the losses in the armature may be reduced to a considerable extent and the rating of the motor may be raised accordingly. Such simultaneous flow of current may be produced in windings which would otherwise receive current in succession during each cycle of the alternating current supply voltage, or it may be obtained in winding portions which would otherwise be energized in succession during each revolution of the motor. A motor controlled as above indicated will retain the advantages inherent in all motors controlled by means of electron discharge devices; in particular, such a motor will be operable at high voltages, will be free from the usual commutation difficulties, may be started and the direction of rotation reversed without the use of switching devices and without dissipation of energy in resistances, and will also be operable for regenerative braking.

It is, therefore, among the objects of the present invention to provide a control system for variable speed alternating current motors in which the motor armature currents are controlled by means of one or more electron discharge devices.

Another object of the present invention is to provide a control system for variable speed alternating current motors in which the anodes of an electron discharge device are severally connected with a plurality of star connected portions of the motor armature for controlling the flow of current therethrough.

Another object of the present invention is to provide a control system for variable speed alternating current motors in which an electron discharge device permits simultaneous flow of current thorugh two or more of the motor armature winding portions during portions of the working periods thereof.

Another object of the present invention is to provide a control system for variable speed alternating current motors in which and electron discharge device permits simultaneous flow of current through two or more of the motor armature winding portions energized sequentially during each cycle of the alternating current supply voltage.

Another object of the present invention is to provide a control system for variable speed alternating current motors in which an electron discharge device permits simultaneous flow of current through two or more of the motor armature winding portions energized sequentially during each revolution of the motor.

Objects and advantages other than those above set forth will be apparent from the specification when read in connection with the accompanying drawings, in which:

Fig. 1 diagrammatically illustrates one embodiment of the present invention in which pairs of motor armature winding portions sequentially energized during each cycle of the alternating current supply voltage are controlled to carry current simultaneously during a portion of the working periods thereof.

Figure 2:
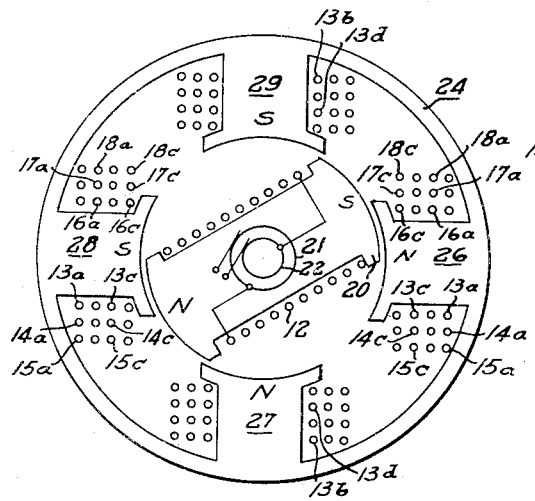

Fig. 2 schematically illustrates the motor portions utilized in the embodiment of Fig. 1.

Figure 3:
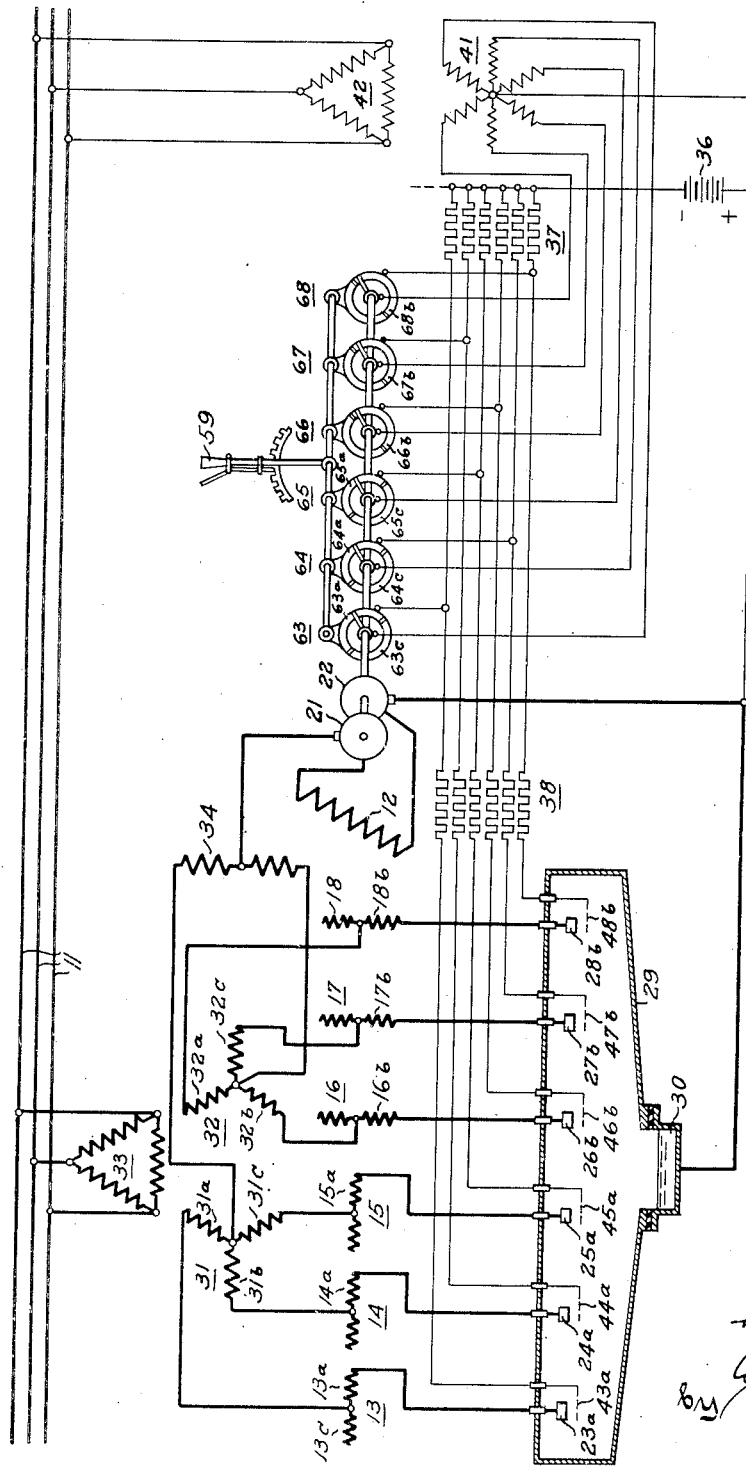

Fig. 3 diagrammatically illustrates a modified embodiment of the present invention differing from that shown in Fig. 1 in that pairs of armature winding portions sequentially energized during each cycle of the alternating current supply voltage are arranged on adjacent poles of the armature to carry current simultaneously during part of their working periods.

Figure 4:
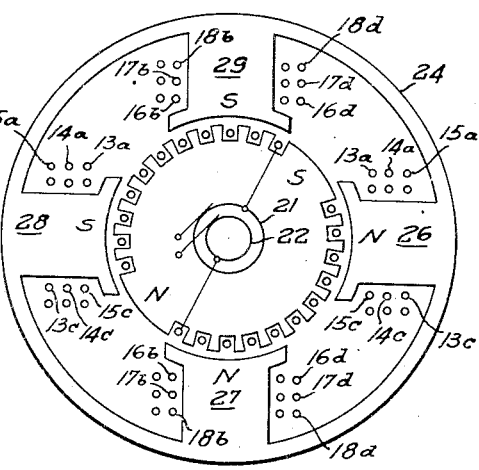

Fig. 4 schematically illustrates the structure of the motor utilized in the embodiment shown in Fig. 3.

Figure 5:
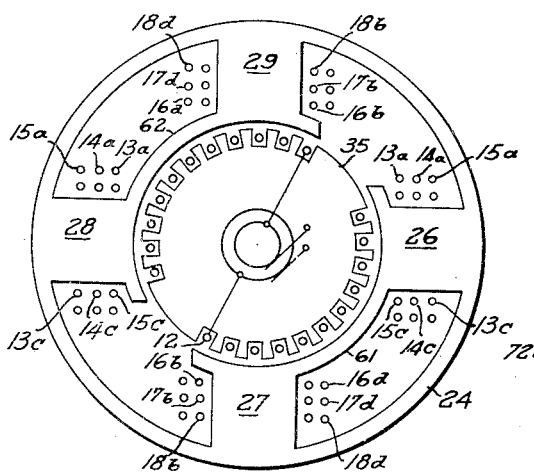

Fig. 5 schematically illustrates the structure of a motor utilized in a further embodiment of the present invention and differing from the structure illustrated in Fig. 4 in the addition of magnetically conductive paths betwen pairs of adjacent poles of the armature.

Figure 7:
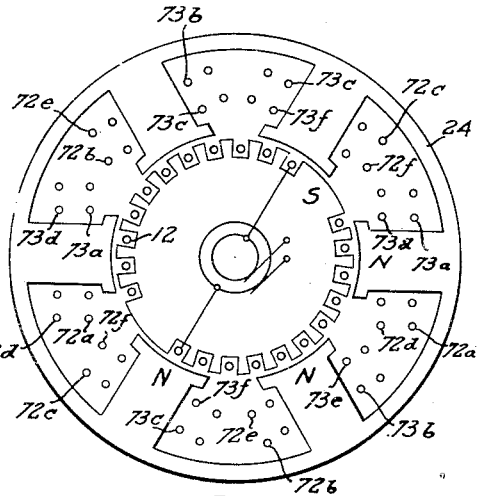
Figure 6:
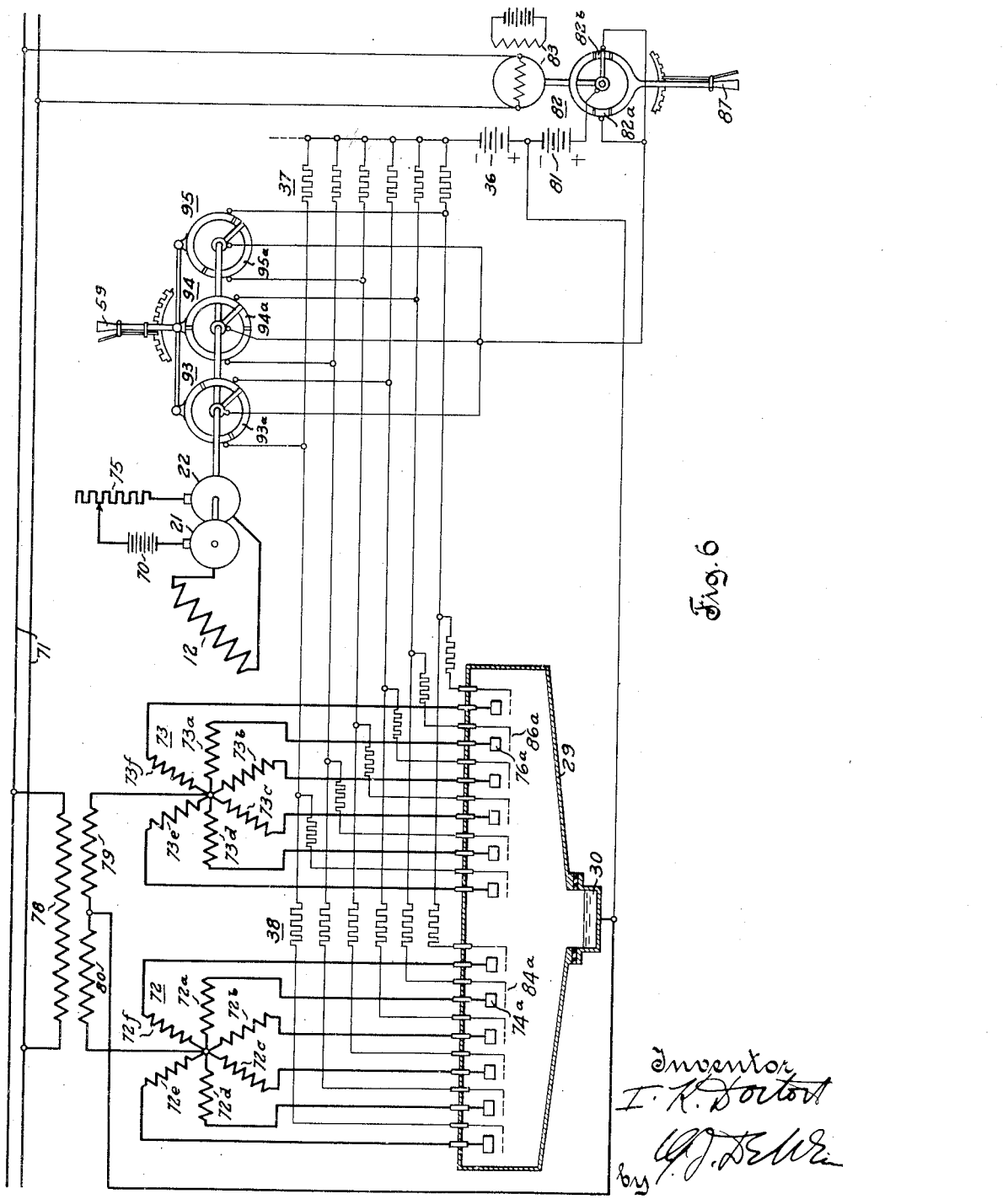

Fig. 6 diagrammatically illustrates a further embodiment of the present invention in which several of the motor armature winding portions sequentially energized during each revolution of the motor are controlled to simultaneously carry current during portions of the working periods thereof; and Fig. 7 schematically illustrates the structure of the motor utilized in the embodiment illustrated in Fig. 6.

Referring more particularly to the drawings by characters of reference, the reference numeral 11 designates a polyphase alternating current supply line shown as a three-phase line, such line being most frequently utilized in commercial practice. Line 11 supplies a polyphase alternating current motor having a field winding 12 and a plurality of armature windings 13, 14, 15, 16, 17, 18, all windings being of the construction usual in the art of so-called synchronous motors. It is assumed that winding 12 is arranged for rotation and must, therefore, be energized through a pair of slip rings such as 21 and 22. The field core 20 of the motor is shown in Fig. 2 as being of the salient pole type, but it may also be of the smooth core type and may present any desired number of pairs of poles upon which portions of winding 12 are distributed as is well known in the art. Each of the armature windings is divided into four portions such as 13a, 13b, 13c, and 13d, the portions of each winding being connected to form a neutral point. Windings 13 to 18 are assembled on the core 24 of the armature shown as presenting salient poles 26, 27, 28 and 29 to permit a clearer illustration of its construction. Each portion of windings 13 to 18 is in turn divided into two sections assembled on two opposite poles of the armature so as to exert cooperating torques on the opposite poles of field 20. It will be understood that armature core 24 may present a smooth bore provided with slots for insertion of windings 13 to 18, such construction being equivalent to that illustrated in Fig. 2. The different portions of the armature windings such as 13a, 14a * * * 18a, are severally connected with anodes 23a, 24a, * * * 28a of an electron discharge device 29 operable as an electric current rectifier and provided with a cathode 30. The neutral points of windings 13, 14 and 15 are connected with the secondary windings 31a, 31b and 31c of a transformer having a primary winding 33 energized from line 11. The neutral points of windings 16, 17 and 18 are similarly connected with another set of secondary windings 32a, 32b, and 32c of the same transformer.

The neutral points of windings 31 and 32 are connected with an auto-transformer 34 of the type generally designated in the electric current rectifier art as an interphase transformer. The middle point of interphase transformer 34 is connected with the brush of slip ring 21 and cathode 30 of electron discharge device 29 is connected with the brush of slip ring 22, thereby providing for series connection of the motor so as to give series characteristics thereto. Rectifier 29 is provided with control electrodes such as 43a, 44a, 45a, 46a, 47a and 48a associated with the anodes which control electrodes are energized at a negative potential with respect to cathode 30 from a battery 36 through banks of current limiting resistances 37 and 38. The control electrodes may also be energized at alternating potentials with respect to cathode 30 from secondary winding 41 of a transformer having a primary winding 42 energized from line 11. Transformer 41, 42 may be constructed as a phase shifter for the purpose of adjusting the phase relation between the supply line voltage and the voltages impressed on the control electrodes of the rectifier thereby obtaining control of the voltages applied to the motor windings and control of the motor speed. The energization of the control electrodes is controlled by means of distributors 53, 54, 55, 56, 57, 58 having their brushes mounted on the shaft of the motor and having their segments spatially adjustable by means of a lever 59.

In operation, assuming the system to be connected as shown in Fig. 1 and the motor field momentarily being in the position indicated in Fig. 2, line 11 energizes winding 33 which induces alternating potentials in the several portions of windings 31 and 32. All the control electrodes of rectifier 29, with the exception of control electrodes 43a, 44a, 45a, 46a, 47a and 48a, receive a negative potential from battery 36 and, therefore, prevent the flow of current through the anodes associated therewith. Control electrodes 43a to 48a receive six-phase alternating potentials from winding 41 through the segments 53a to 58a of the distributors and through bank of resistances 38. Transformer 41, 42 is so adjusted that control electrodes 43a to 48a sequentially become positive with respect to cathode 30 when the associated anodes 23a to 28a respectively are energized at positive potentials from windings 31 and 32 connected therewith. Anodes 23a to 28a are thus sequentially made operable for carrying current during each cycle of the supply line voltage and would carry current only during separate successive periods if interphase transformer 34 was not inserted in their circuit. As is well known in the electric current rectifier are interphase transformer 34 causes a lengthening of the current carrying period of each winding portion of windings 31 and 32 to such extent that current is always flowing simultaneously in one of the portions of transformer winding 31 and in one of the portions of transformer winding 32. Current is, therefore, simultaneously flowing in one of armature winding portions 13a, 14a and 15a and in one of armature winding portions 16a, 17a and 18a. Such currents combine to form direct current flowing from cathode 30 through slip ring 22, field winding 12, slip ring 21, interphase transformer 34 to windings 31 and 32. The flow of current through windings 12 and 13a to 18a during one or more cycles of the supply line voltage produces a torque on field core 20 which causes rotation thereof. Such rotation also causes the brushes of the distributors to leave segments 53a to 58a and to come into contact with segments 53b to 58b. Control electrodes 43a to 48a thus become negatively energized from battery 36, thereby preventing the associated anodes 23a to 28a from again carrying current during subsequent cycles of the supply line voltage. Control electrodes 43b to 48b (not shown in Fig. 1) then receive alternating potentials from winding 41 thereby permitting operation of the associated anodes in a manner similar to that previously described for anodes 23a to 28a. Currents thus flow through windings 12 and 13b to 18b during one or more cycles of the supply line voltage, thereby again producing a torque on the motor and causing futher rotation of field core 20. The above process is repeated sequentially for each portion of armature windings 13 to 18 during each revolution of the motor. Depending upon the speed of the motor, each particular portion of the armature windings will receive current during a variable number of cycles of the supply line voltage. As will appear from reference to Fig. 2, energization of windings 13a to 18a will magnetize poles 26 and 28 at opposite polarities assumed as being North and South respectively. Assuming that the pole of field core 20 adjacent to pole 26 is a South pole, the field will tend to rotate in a clockwise direction until field core 20 comes into line with poles 26 and 28. Windings 13a to 18a being then deenergized by the action of the control electrodes, and windings 13b to 18b being thereupon energized, poles 26 and 28 will become ineffective and pole 27 will be magnetized at a North polarity and pole 29 at a South polarity. It will be understood that the attraction of poles 27 and 29 and of field core 20 will cause further rotation of such field core in a clockwise direction. The above process, as already mentioned, is repeated sequentially for the remaining windings, thus also producing sequential energization at a North polarity of poles 28 and 29, the entire cycle of operation then being repeated when pole 26 is again energized at the North polarity.

In the embodiment illustrated in Figs. 3 and 4, one-half of the portions of windings 13 to 18 are omitted and consequently distributors 53 to 58 each of which have four segments are replaced by distributors 63 to 68 each having only two segments. Instead of assembling one portion of each of windings 13 to 18 on each pole of the armature as shown in Fig. 2, in the present embodiment, portions of armature windings 13, 14 and 15 are mounted on opposite poles and portions of windings 16, 17 and 18 are mounted on another pair of opposite poles. As will appear from the following description of the operation of the system shown in Fig. 3, all poles are made to carry magnetic flux simultaneously and must, therefore, all close their magnetic circuits through an air gap of the same magnitude. In the present embodiment a salient pole field therefore cannot be used and the motor is provided with a smooth core 35 carrying field winding 12.

In operation, as in the embodiment illustrated in Fig. 1, windings 13 to 18 are sequentially energized at six-phase alternating potentials from windings 31 and 32, current simultaneously flowing at every instant through one of armature windings 13, 14 and 15 and one of armature windings 16, 17 and 18. As will appear from Fig. 4, winding portions 13a, 14a, 15a, 16b, 17b, 18b, which receive six-phase currents for the position of the motor illustrated, are wound so as to energize poles 26 and 27 at a North polarity and to energize poles 28 and 29 at a South polarity. Field 12 will, therefore, receive a torque in a clockwise direction until the South pole thereof is opposite the middle point of North poles 26 and 27. Such rotation of field 12 also causes rotation of the brushes of the distributors in such a manner that the brushes of distributors 63, 64 and 65 leave segments 63a, 64a, 65a and come into contact with segments 63c, 64c and 65c. Control electrodes 43a, 44a, 45a are thus energized at a negative potential from battery 36 and prevent further flow of current through the associated anodes 23a, 24a, 25a. Further flow of current is thus prevented in armature windings 13a, 14a and 15a and, by a process similar to that described above in relation to Fig. 1, flow of current is released in armature winding portions 13c, 14c, and 15c. During such operation, windings 16b, 17b, and 18b, remain energized as the brushes of distributors 66, 67 and 68 are still in contact with segments 66b, 67b, and 68b. As a result of such a current distribution, pole 27 remains a North pole and pole 29 remains a South pole, but pole 28 becomes a North pole and pole 26 becomes a South pole. The magnetic axis of armature 24 is thus shifted to between poles 27 and 28 and between poles 26 and 29 thus causing further rotation of field 30 in a clockwise direction. The above process is sequentially repeated for each pair of poles, thereby producing continuous rotation of field core 35. It will be understood that, in the present embodiment, for each position of the motor field, current is carried simultaneously during portions of the working periods of the armature windings receiving six-phase currents from transformer windings 31 and 32, and that current is also carried simultaneously in the armature windings assembled on different poles such as 26 and 27, such windings being energized sequentially during the rotation of the motor. For instance, winding portion 18b, during each cycle of the alternating current supply voltage, carries current simultaneously with winding 13a during one-half of working period thereof and carries current simultaneously with winding portion 14a during the other half of such period. Upon rotation of the motor field, winding 18b no longer carries current simultaneously with windings 13a and 14a but carries current simultaneously with windings 13c and 14c.

In the embodiment illustrated in Fig. 5, poles 26 and 27 are shown bridged by a magnetic portion 61 and poles 28 and 29 are bridged by a magnetic portion 62. The connections for the present embodiments are similar to those shown in Fig. 3 except that interphase transformer 34 may be omitted and the neutral points of transformer windings 31 and 32 may both be directly connected with the brush of slip ring 21. In the present embodiment, armature windings 13a, 14a, 15a, 16b, 17b and 18b, are again operable for carrying six-phase alternating currents for the position of field 12 shown in Fig. 5. Interphase transformer 34 being omitted, windings 31 and 32 tend to supply six-phase currents of a duration of one-sixth of a cycle of the alternating current voltage to windings 13 to 18. For instance, current may be supplied to winding 13a for one-sixth of a cycle and thereafter supplied to winding 16b also for one-sixth of a cycle. Due to the presence of the magnetic bridges 61 and 62, alternating magnetic fluxes circulate between pole 26 and pole 27 and between pole 28 and pole 29. At the end of the period during which armature winding 13 receives current, the voltage of transformer winding 31a becomes lower than the voltage of transformer winding 32a so that current tends to cease flowing in winding 13a and to start flowing in winding 16b. Part of the flux produced in pole 27 is, however, diverted over bridge 61 to oppose the flux in pole 26 and part of the flux of pole 29 is simultaneously diverted to pole 28 over bridge 62, so that the counter electromotive force of winding 13a becomes lower than that of winding 16b, thereby permitting simultaneous operation of such windings even though the voltages impressed thereon may be of different magnitudes. It will be apparent that the magnetic fluxes in bridges 61 and 62 have the same effect as the magnetic flux in interphase transformer 34 illustrated in Fig. 3.

The system and structure illustrated in Figs. 6 and 7 respectively illustrate the application of the invention to a single phase alternating current motor to simplify the diagram of connections and thus facilitate understanding of the invention. The motor is then supplied from a single phase alternating current line 71 and is provided with a field winding 12, similar to that described for the other embodiments, and with two armature windings 72 and 73. In the present embodiment, the field energized by winding 12 is again of the smooth core type to permit simultaneous flow of magnetic flux through all the poles of the armature. Windings 72 and 73 are each divided into a plurality of portions shown assembled on salient poles of armature 24, but may also be inserted into slots of a smooth bore armature. The armature winding portions such as 72a and 73a are severally connected with anodes as at 74a and 76a of an electron discharge device 29. The neutral points of windings 72 and 73 are connected respectively with secondary windings 79 and 80 of a supply transformer having a primary winding 78 energized from line 71. Cathode 30 of device 29 is directly connected with the common point of windings 79 and 80. In the present embodiment, field winding 12 is assumed to be supplied from an independent source of direct current such as a battery 70, the current in the field being regulated by adjustment of a rheostat 75. The flow of current through the armature is controlled by means of control electrodes such as 84a and 86a of device 29, such control electrodes again receiving negative potentials with respect to cathode 30 from battery 36. The control electrodes may also be energized at a positive potential with respect to cathode 30 from a battery 81 through the segments of a distributor 82 having a brush mounted on the shaft of a synchronous motor 83 energized from line 71. The position of distributor 82 may be adjusted by means of a lever 87. The energization of the control electrodes is further controlled by distributors 93, 94 and 95 having their brushes mounted on the motor shaft and having their segments spatially adjustable by means of lever 59. In operation, assuming that the system is connected as shown and that the several portions thereof are in the position indicated in Fig. 6, one-half of the control electrodes of rectifier 29 receive a negative potential relative to cathode 30 from battery 36 through resistance 37 and 38. The remaining control electrodes receive a positive potential from battery 81 through distributor segment 82a and through distributor segments 93a, 94a or 95a. As will be apparent from Fig. 6, such energization will permit operation of the anodes connected with winding portions 72a, 72b, 72c, 73a, 73b, and 73c. Assuming that, at the moment considered, winding 72 is receiving a positive potential from winding 80, current will flow from winding 80 simultaneously through windings 72a, 72b and 72c to cathode 30 back to winding 80. The poles carrying such winding portions will, therefore, have magnetic fluxes which may be assumed to be of such a polarity as to produce rotation of field core 35 in a clockwise direction. During the following half cycle of the alternating current supply voltage, the above mentioned one-half of the control electrodes of rectifier 29 will be positively energized relative to the potential of cathode 30 from battery 81 through segment 82b of distributor 82. Winding 73 thereupon receives a positive potential from winding 79 and current flows from winding 79 simultaneously through winding portions 73a, 73b, 73c which are wound on the poles of armature 24 in such a way as to produce a further torque in a clockwise direction on the motor. The above portions of windings 72 and 73 are thus alternately energized during each half cycle of the alternating current supply voltage until field 30 has progressed in a clockwise direction by an angle equal to one pole pitch. As will appear from Fig. 6 the winding portions which will then be operable due to the control of the control electrodes will be 72b, 72c, 72d, 73b, 73c, 73d. Such portions will again be alternately energized by a process similar to that above described thereby causing further rotation of field 30 in a clockwise direction. The above process is repeated sequentially for each portion of windings 72 and 73 to cause continuous rotation of field 30.

In the present embodiment as well as in the embodiments previously described, adjustment of lever 59 determines the portions of the armature windings which receive current for all positions of the motor field, thereby permitting adjustment of the torque produced by the action of the field and of the armature currents. The intensity of the armature current in all embodiments is controlled by means of the control electrodes of device 29, such control being obtained in the embodiments shown in Figs. 1 and 3 by adjustment of phase shifter 41, 42 and in the embodiment shown in Fig. 6 by adjustment of lever 87, the result in all embodiments being that, during each cycle of the supply line voltage, the current in the armature windings may flow during different parts of the voltage cycle.

In all embodiments, assuming that, in the position shown for lever 59, the flow of current through the armature windings of the motor produces the maximum torque therein, a gradual shift of the distributor segments by means of lever 59 will cause such torque to decrease in value and to reach zero when such distributors are moved by an angle of ninety electrical degrees. Further shifting of the distributors will cause the currents in the armature to produce a torque opposite to the torque previously produced, thereby permitting reversal of the direction of rotation of the motor without the use of switching devices and without dissipation of energy in resistances. During starting of the motor, the current therethrough may be maintained at any desired value by adjustment of phase shifter 41, 42 or of lever 87 controlling distributor 82.

In the embodiments illustrated in Figs. 1 and 3, reversal of the distributors during rotation of the motor will cause such motor to cease producing an accelerating torque and will cause such motor to produce a retarding torque and to operate as a generator, thereby producing regenerative braking of the motor. In the embodiment illustrated in Fig. 6, due to the independent excitation of the field winding, such regenerative braking is obtained automatically when the back E. M. F. in the armature windings exceeds the voltage impressed thereon from the line through transformer 78, 79, 80. It will be understood that, for the purpose of regenerative braking, the motors illustrated in Figs. 1 and 3 may be reconnected for independent excitation of the field windings thereof in a manner similar to that illustrated in Fig. 6, whereupon the regenerative braking becomes automatic without shifting of the distributors.

Although but a few embodiments of the present invention have been illustrated and described, it will be apparent to those skilled in the art that various modifications and changes may be made therein without departing from the spirit of the invention or from the scope of the appended claims.

It is claimed and desired to secure by Letters Patent:

1. In a control system for a motor having a plurality of armature windings and a field winding each divided into a plurality of angularly displaced sections, an alternating current supply line connected with said windings, an electron discharge device connected with the windings of the motor for controlling the energization thereof, a source of potential, adjustable means controlling the operation of said device by controlling the connection of said source therewith, and means for inducing the simultaneous energization of at least two portions of different ones of said armature windings.

2. In a control system for a motor having a plurality of armature windings and a field winding, a polyphase alternating current supply line connected with said windings, an electron discharge device connected with the armature windings of the motor for controlling the energization thereof, a source of potential, adjustable means controlling the operation of said device by controlling the connection of said source therewith, and means for inducing simultaneous energization of portions of at least two of said armature windings supplied with current from different phases of said supply line.

3. In a control system for a motor having a plurality of armature windings and a field winding each divided into a plurality of angularly displaced sections, an alternating current supply line connected with said windings, an electron discharge device connected with the armature windings of the motor for controlling the energization thereof, a source of direct current, means for obtaining low potential alternating current (from said line), means connected with said source and with the first said means for controlling the operation of said device, and means for inducing simultaneous energization of at least two portions of different ones of said armature windings.

4. In a control system for a motor having a plurality of armature windings and a field winding, a polyphase alternating current supply line, a transformer connecting the windings of the motor with said supply line, an electron discharge device connected with the windings of the motor, and means controlling the operation of said device to induce the simultaneous energization of portions of at least two of said armature windings supplied with current from different phases of said supply line.

5. In a control system for motor having a plurality of armature windings and a field winding, a polyphase alternating current supply line, a transformer connected with said supply line, said transformer having a plurality of secondary windings each having a neutral point, the terminals of the secondary windings being connected with the armature windings and the neutral points being connected with the field winding of the motor, an electron discharge device having anodes and a cathode, the anodes being connected with the armature windings and the cathode being connected with the field winding of the motor, and means for controlling the operation of said device to control the simultaneous energization of portions of the motor windings.

6. In a control system for a motor having a plurality of armature windings each divided into a plurality of angularly displaced sections connected to form a neutral point and having a field winding, a polyphase alternating current supply line, a transformer connected with said supply line, said transformer having a plurality of secondary windings each divided into a plurality of phase sections connected to form a neutral point, the terminals of the secondary windings being severally connected with the said neutral points of the armature windings and the neutral points of the secondary windings of said transformer being connected with the field winding of the motor, an electron discharge device having anodes and a cathode, the anodes being severally connected with the terminals of the armature windings and the cathode being connected with the field winding of the motor, means for controlling the operation of said device to control the sequential energization of the respective sections of said armature windings, and means for inducing the simultaneous energization of at least two sections of said armature windings.

7. In a control system for a motor having a plurality of armature windings each divided into a plurality of angularly displaced sections and a field winding, an alternating current supply line connected with the motor windings, an electron discharge device having anodes with associated control electrodes, the anodes being severally connected with the sections of said armature windings and the cathode being connected with the field winding of the motor, a source of potential, a plurality of distributors for cooperatively controlling the connection of said source with the control electrodes to control the operation of said device to cause the sequential energization of the respective sections of each one of said armature windings, and means for inducing the simultaneous energization of at least two sections of different ones of said armature windings.

8. In a control system for a motor having a plurality of armature windings each divided into a plurality of angularly displaced sections and a field winding, an alternating current supply line connected with the motor windings, an electron discharge device having anodes with associated control electrodes, the anodes being severally connected with the sections of said armature windings and the cathode being connected with the field winding, a source of potential, a plurality of distributors for controlling the connection of the control electrodes with said source to control the operation of said device to cause the sequential energization of each one of the respective sections of said armature windings, means for inducing the simultaneous energization of at least two sections of different ones of said armature windings, and means for controlling the connection of said source with said distributors.

9. In a control system for a motor having a plurality of armature windings each divided into a plurality of angularly displaced sections and a field winding, an alternating current supply line connected with the motor windings, an electron discharge device having a cathode and having anodes with associated control electrodes, the anodes being severally connected with the sections of said armature windings and the cathode being connected with the field winding of the motor, a source of potential, a plurality of distributors operable by said motor and controlling the connection of the control electrodes with said source at such recurring periods as to cause the sequential energization of the respective sections of each one of said armature windings, means for producing the simultaneous energization of at least two sections of different ones of said armature windings and a distributor operated in dependence upon the voltage frequency of said supply line to control the connection of said source with the first said distributors.

10. In a motor control system, an alternating current supply line, a motor having rotating field windings and a plurality of armature windings each divided into a plurality of star connected portions, a transformer connecting the motor windings with said line, an electron discharge device connected with the motor windings and controlling the flow of current therethrough, means for controlling the operation of said device to cause the sequential energization of different portions of each one of said armature windings, and means for inducing the simultaneous energization of at least two portions of different ones of said armature windings.

11. In a control system for an electric motor comprising a plurality of armature windings each divided into a plurality of angularly displaced sections, an alternating current supply line connected with said windings, electron discharge means comprising a plurality of anodes severally connected with the sections of the several said windings, and a plurality of control electrodes severally associated with said anodes, means having connections with said control electrodes operable to impress potential on the latter of such sign and magnitude and at such recurring periods as to control the flow of current from said supply line sequentially through the respective sections of each one of said windings by way of said anodes, and means for inducing the said flow of current simultaneously through at least two sections of different ones of said windings.

12. In a control system for a motor having a field excitation winding and a plurality of armature windings each divided into a plurality of angularly displaced sections connected to form a neutral point, an alternating current supply line, a transformer connected with said line and having a plurality of windings each divided into a plurality of phase displaced sections connected to form a neutral point and being severally connected with the neutral points of said armature windings, electron discharge means comprising a cathode connected with said field winding, a plurality of anodes severally connected with the said sections of the several said armature windings, means having connections with said supply line and with said control electrodes operable to periodically apply potential thereto of such sign and magnitude and during such recurring periods as to control the moments of initiation of flow of current from said supply line sequentially through the several sections of the respective said armature windings by way of said anodes and cathode, the said means including distributor switch means for varying the moments of application of said potential to said control electrodes, and means connecting the said neutral points of said transformer windings with said field winding operable to induce the said flow of current simultaneously through two or more sections of said armature windings.

13. In a control system for an electric motor having a field excitation winding, and a plurality of armature windings each divided into a plurality of angularly displaced sections, an alternating current supply line connected with said windings, electron discharge means comprising a cathode connected with said field winding, a plurality of anodes severally connected with the sections of the several armature windings, and a plurality of control electrodes severally associated with said anodes, means having connections with said control electrodes operable to impress potential on the latter of such sign and magnitude and at such recurring periods as to control the moments of flow of current from said supply line sequentially through the respective sections of each one of said armature windings by way of said anodes and cathode, and means for inducing the said flow of current simultaneously through at least two sections of different ones of said armature windings.

14. In a control system for an electric motor having a field excitation winding and a plurality of armature windings each comprising a plurality of angularly displaced sections connected to form a neutral point, an alternating current supply line, a transformer connected with said line and having a plurality of windings each divided into a plurality of phase sections severally connected with the neutral points of said armature windings, electron discharge means comprising a cathode connected with said field winding, a plurality of anodes severally connected with the sections of said armature windings, and a plurality of control electrodes severally associated with said anodes, a source of current having connections with said cathode and with said control electrodes for continuously impressing potential on the latter of such sign and magnitude as to prevent flow of current through the sections of said armature windings by way of said anodes, means having connections with said supply line and with said control electrodes operable to impress potential on the latter of such sign and magnitude and during such recurring periods as to permit initiation of flow of current from said supply line sequentially through the respective sections of said armature windings by way of said anodes and cathode, and means interconnecting the neutral points of said transformer windings with said field winding operable to induce the flow of current simultaneously through at least two sections of said armature windings.

15. In a control system for a motor having a plurality of armature windings each divided into a plurality of displaced sections and a field winding, a polyphase alternating current supply line connected with said windings, an electron discharge device connected with the several sections of the armature windings of the motor for controlling the energization thereof, a source of direct current, means for obtaining low potential current from said line, means connected with said source and with the first said means for controlling the operation of said device, and means for obtaining simultaneous energization of a plurality of portions of different ones of said armature windings supplied with current from different phases of said line.

16. In a control system for a motor having a plurality of armature windings each having a plurality of displaced sections and a field winding, a polyphase alternating current supply line, a transformer connected with said supply line, said transformer having a plurality of secondary windings each having a neutral point, the terminals of the secondary windings being connected with the several sections of the armature windings, an electron discharge device having anodes and a cathode, the anodes being connected with the several sections of the armature windings and the cathode being connected with the neutral points of said transformer, and means for controlling the operation of said device to control the simultaneous energization of portions of the armature windings.

17. In a control system, a polyphase alternating current supply line, a motor comprising a field winding distributed on a cylindrical field core to produce distributed magnetic poles therein, a plurality of armature windings arranged on a plurality of armature poles, and a magnetic shunt joining the face of each pole with the face of another pole adjacent thereto; an electron discharge device connected with the said armature windings to control the energization thereof, and adjustable means controlling the operation of said device to sequentially release the flow of current through the several said armature windings cooperating with said magnetic shunt in causing simultaneous flow of current through windings supplied with current from different phases of said supply line.

18. In a control system, a polyphase alternating current supply line, a motor comprising a field winding distributed on a cylindrical field core to produce distributed magnetic poles therein, a plurality of armature windings arranged on a plurality of armature poles, each pair of opposite poles carrying windings receiving current from a plurality of the phases of said line, and a magnetic shunt joining the face of each pole with the face of another pole adjacent thereto; an electron discharge device connected with the said armature windings to control the energization thereof, and adjustable means controlling the operation of said device to sequentially release the flow of current through the several said armature windings cooperating with said magnetic shunt in causing simultaneous flow of current through windings supplied with current from different phases of said supply line.

19. In a control system, a polyphase alternating current supply line, a motor comprising a field winding distributed on a cylindrical field core to produce distributed magnetic poles therein, a plurality of armature windings arranged on a plurality of armature poles, each pair of opposite poles carrying windings receiving current from phases of said line forming a polyphase system and each pair of opposite poles adjacent each first said pair receiving current from phases of said line forming another polyphase system, and a magnetic shunt connecting the face of each pole of one of the first said pairs with the face of a pole of one of the second said pairs; an electron discharge device connected with the said armature windings to control the energization thereof, and adjustable means controlling the operation of said device to sequentially release the flow of current through the several said armature windings cooperating with said magnetic shunt in causing simultaneous flow of current through windings supplied with current from different phases of said supply line.

20. In combination a polyphase dynamo-electric machine provided with a plurality of phase windings, a plurality of inductive windings, an electric valve means connected to control the energization of each of said phase windings through one of said inductive windings, and means for sequentially rendering said electric valve means conductive in groups, said inductive windings being connected to force current to flow simultaneously in all of said valve means of a group.

ISADORE K. DORTORT.